United States Patent

Ishihara et al.

[11] Patent Number: 4,684,213
[45] Date of Patent: Aug. 4, 1987

[54] SUBMARINE OPTICAL FIBER CABLE WITH DAM MEANS

[75] Inventors: Koushi Ishihara; Yasuji Murakami; Nobuyuki Yoshizawa, all of Mito; Kiyoshi Funaki, Yokohama, all of Japan

[73] Assignees: Nippon Telegraph & Telepone Public Corporation; Ocean Cable Co., Ltd., both of Tokyo, Japan

[21] Appl. No.: 609,889

[22] Filed: May 14, 1984

[30] Foreign Application Priority Data

May 24, 1983 [JP] Japan ............... 58-77066[U]
Jul. 21, 1983 [JP] Japan ............... 58-131815

[51] Int. Cl.⁴ .................................. G02B 6/44
[52] U.S. Cl. .................................. 350/96.23
[58] Field of Search ............ 350/96.23; 174/70 R, 174/70 S

[56] References Cited

U.S. PATENT DOCUMENTS

| 4,288,144 | 9/1981 | Nakai et al. | 350/96.23 |
| 4,435,238 | 3/1984 | Smith | 350/96.23 |
| 4,464,013 | 8/1984 | Sabia | 350/96.23 |
| 4,490,009 | 12/1984 | Nakai et al. | 350/96.23 |
| 4,522,464 | 6/1985 | Thomson et al. | 350/96.23 |

FOREIGN PATENT DOCUMENTS 2017968  8/1982  United Kingdom .

*Primary Examiner*—William L. Sikes
*Assistant Examiner*—Frank González
*Attorney, Agent, or Firm*—Frishauf, Holtz, Goodman & Woodward

[57] ABSTRACT

A submarine optical fiber cable includes inner and outer dams at suitable intervals for limiting water flow in the cable. The outer dams are formed in a space between inner and outer metal tubes of a pressure resisting sheath of the cable, and the inner dams are formed in the inner tube in which an optical fiber unit is enclosed. Each dam is made of a sticky compound or a jelly of plastics resin which is loaded at the dam position. The cable is also provided with a scale which represents distance from one end of the cable.

7 Claims, 10 Drawing Figures

SUBMARINE OPTICAL FIBER CABLE WITH DAM MEANS

BACKGROUND OF THE INVENTION

1. Field of the Invention

The present invention relates to submarine optical fiber cables and in particular, to cable constructions for protecting the interior construction of the cable from sea water ingress into the cable.

2. Description of the Prior Art

It has been attempted to use optical fibers as transmission media of submarine cables.

A submarine optical fiber cable which has already been proposed includes an optical fiber unit comprising at least one optical fiber core and a tension member which are covered together with a buffer layer of an insulating material in accordance with necessity, as disclosed in UK Pat. No. GB 2017968 B. The optical fiber unit is enclosed in a pressure resisting sheath for protecting the optical fiber unit from the external pressure. The pressure resisting sheath is covered with an outer water-proof jacket comprising a layer or layers of insulating materials.

In such a cable, if the pressure resisting sheath and the outer jacket are damaged unfortunately during or after being laid, sea water enters, or leaks into, the pressure resisting sheath so that the cable cannot be repaired but must be replaced by a new one. In order to prevent the sea water from flowing over the entire length of the cable, it is known to provide dams in the pressure resisting sheath at suitable intervals, for stopping the introduced sea water from flowing longitudinally therein, as shown in FIG. 4 of the above-described UK Patent.

In a certain construction of optical fiber submarine cables for deep sea, the pressure resisting sheath is composed of an inner and an outer metal tube coaxial with each other and tension wires extended in an annular space between the inner and the outer metal tubes. In such an arrangement, even if such dams are provided in the inner metal tube, the introduced water flows along the tension wires over the entire length of the cable.

Further, if there is any opening, pin hole or other production fault in the inner metal tube, the introduced sea water also enters the inner tube and longitudinally flows to wet the optical fiber core.

When a submarine optical fiber cable is damaged or broken after being laid, it is necessary to hang up a cable section having the faulty point onto a ship for repairing the broken point. However, it is practically difficult to measure a distance from the hanged-up portion of the cable to the faulty point along the cable.

SUMMARY OF THE INVENTION

It is therefore an object of the present invention to provide a submarine optical fiber cable wherein a pressure resisting sheath includes an intermediate layer of tension wires and wherein introduction of sea water through a damaged point of the cable is reliably localized to a limited section of the cable.

It is another object of the present invention to provide a submarine optical fiber cable which enables a broken point of the cable to be readily determined on a ship.

As described above, a submarine optical fiber cable includes an optical fiber unit, a pressure resisting sheath mounted on the outer surface of the optical fiber unit, and a water-proof outer jacket surrounding the outer surface of the pressure resisting sheath. The optical fiber unit comprises a tension member, at least one optical fiber core and a buffer layer of an insulating material covering the tension member and the optical fiber core together. The pressure resisting sheath comprises an inner metal tube mounted on the buffer layer, tension wires being helically wound on the inner metal tube, and an outer metal tube being mounted on the tension wire winding. According to the present invention, a plurality of outer dam means are provided in a space between the inner and the outer metal tubes at predetermined intervals to prevent water from flowing longitudinally in the space, and inner dam means are disposed in the inner metal tube to exist at a plurality of positions corresponding to the plurality of outer dam means along the cable. The inner dam means prevents water from flowing longitudinally along the optical fiber unit. The outer and inner dam means are formed by sticky compound or jelly of plastic material which is loaded at respective dam positions within the cable.

According to another aspect of the present invention, the submarine optical fiber cable has a scale within, or on the outer surface of, the cable to represent distance from one end of the cable.

Further objects, features and other aspects will be understood from the following detailed description of preferred embodiments referring to the accompanying drawings.

DETAILED DESCRIPTION OF PREFERRED EMBODIMENTS

Prior to description of embodiments of the present invention, a known submarine optical fiber cable is described below.

Figure 2:
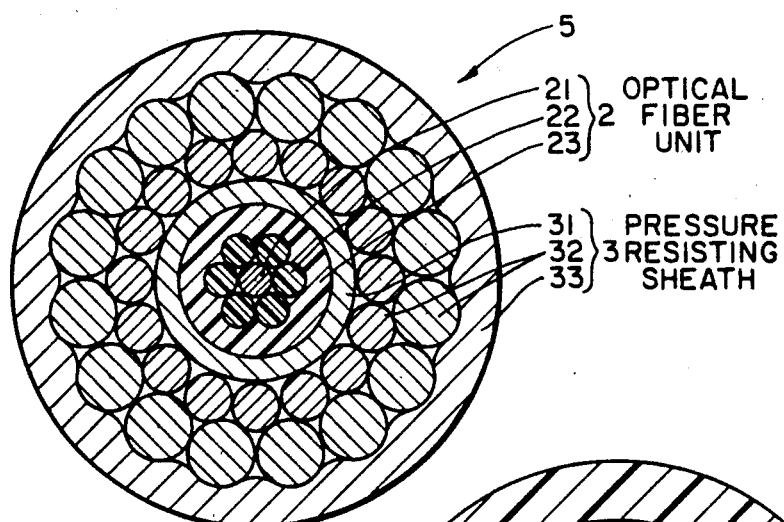
FIG. 2 is an enlarged cross-sectional view of a pressure-resisting cable unit with an outer jacket being disassembled.
Figure 1:
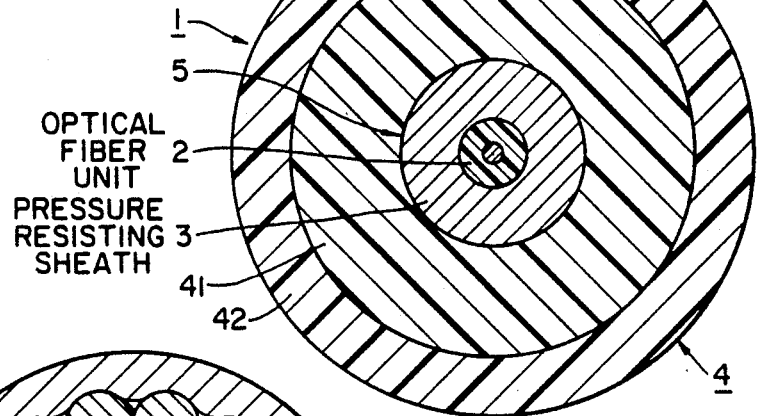
FIG. 1 is a cross-sectional view of a known submarine optical fiber cable.

Referring to FIGS. 1 and 2, a submarine optical fiber cable 1 includes an optical fiber unit 2, a pressure resisting sheath 3 mounted on an outer surface of optical fiber unit 2, and a water-proof outer jacket 4 mounted on an outer surface of pressure resisting sheath 3.

Optical fiber unit 2 includes a central tension member 21, and one or more optical fiber cores 22 (six cores being shown) and a buffer layer 23. Tension member 21 is made of, for example, a steel wire. Optical fiber core 22 is an optical fiber element coated with a thin plastic resin layer, and is extended along tension member 21. Buffer layer 23 is for fastening optical fiber cores 22 and tension member 21 together and covers them. Buffer layer 23 is formed by winding, for example, polypropylene yarns, or by molding a plastic resin, for example, silicone rubber.

Optical fiber unit 2 is enclosed in pressure resisting sheath 3 to form a pressure-resisting cable unit 5.

In deep-sea submarine optical cable, pressure resisting sheath is composed of an inner metal tube 31, tension wires 32 (two layers of wire being shown) wound on inner tube 31, and an outer metal tube 33 surrounding tension wires 32. Inner and outer metal tubes 31 and 33 are made of aluminum, aluminum alloy, or copper, and tension wires 32 are made of, for example, steel.

Each tube is formed by curving a metal tape in a cylindrical form so that both side edges come into contact with each other. Therefore, the tube has a longitudinally extending seam. In outer tube 33, the seam is welded, but the seam of inner tube 31 is not welded in a certain case.

Water-proof outer jacket 4 is composed of at least one layer (two layers 41 and 42 being shown in FIG. 1) of, such as, plastics resin material.

In the arrangement of the submarine optical fiber cable, when outer jacket 4 and outer tube 33 are unfortunately damaged during or after being laid, sea water enters outer tube 33 through the damaged portion and flows over the entire length of the cable through spaces between tension wires 32 and outer and inner tubes 33 and 31. Further, in case the seam of inner tube 31 is not welded, the entering sea water also flows into the inner tube 31 through a gap at the seam to wet optical fiber unit 2 over the entire length thereof. The similar situation is caused in case the seam of inner tube 31 is welded, if the inner tube has a welding fault or faults, pin holes, or damaged portion. Therefore, the optical fiber submarine cable of FIGS. 1 and 2 can not be repaired even if it is partially damaged, and must be replaced by a new one.

The present invention attempts to localize ingress of sea water into the cable through a damaged portion and to prevent the introduced sea water from flowing along the cable.

Figure 3:
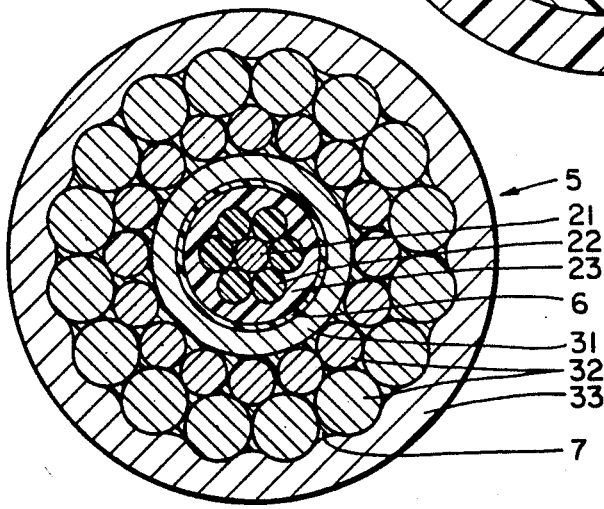
FIG. 3 is a cross sectional view of a pressure-resisting cable unit of an embodiment of the present invention, which is taken along a line III—III in FIG. 4.
Figure 4:
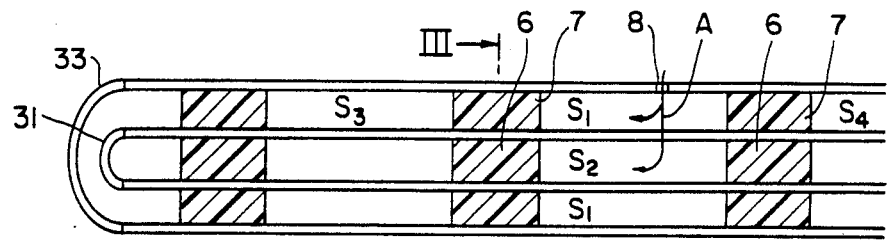
FIG. 4 is a longitudinal sectional view of the pressure-resisting cable unit, with the interior components being omitted for clearly illustrating dam positions.

Referring to FIGS. 3 and 4, an embodiment of the present invention has a cable construction similar to the submarine optical fiber cable of FIGS. 1 and 2. The similar parts are represented by the same reference numbers in FIGS. 1 and 2, and the detailed description of them are omitted for the purpose of simplification of the description. The water-proof outer jacket is also omitted.

The submarine optical fiber cable of the embodiment shown therein is characterized by inner dams 6 and outer dams 7 which are provided in inner tube 31 and outer tube 33 at suitable intervals. Each of inner and outer dams 6 and 7 is for limiting or stopping the sea water ingress thereat, even if the outer jacket (not shown) and outer tube 33 are damaged and sea water enters outer tube 33 through the damaged portion 8 as indicated by arrows A in FIG. 4.

It is important that the inner dams 6 must exist at the same position along the cable as positions where the outer dams 7 are located.

Figure 5:
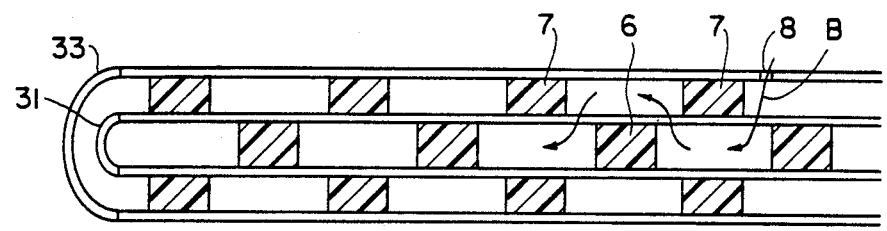
FIG. 5 is a view similar to FIG. 4 for illustrating a comparative example.

If inner dams 6 and outer dams 7 are located offset from one another in the longitudinal direction of the cable as shown in FIG. 5, it is impossible to stop the introduced sea water from flowing along the cable. When sea water enters outer tube 33 through damaged portion 8, it flows through outer tube 33 and inner tube 31 alternatively, as shown by arrows B in FIG. 5, if inner tube 31 has a longitudinal gap or any faults at the seam as described above. As a result, the interior of the cable is wetted by sea water over its entire length.

In the arrangement of the embodiment of FIGS. 3 and 4, the entrance of sea water is localized. When sea water enters a section $S_1$ between two adjacent outer dams 7 in the outer tube 33 through damaged portion 8, the introduced sea water flows into an inner tube section $S_2$ between adjacent two dams 6 through the gap or fault at the seam of inner tube 31. However, the sea water flow is stopped in section $S_2$ by the adjacent dams 6 and is also prevented from flowing into next outer tube sections $S_3$ and $S_4$ adjacent outer tube section $S_1$. Because outer and inner dams 7 and 6 are located at the same positions along the cable so that the inner tube section $S_2$ is not connected with outer tube sections $S_3$ and $S_4$ through any openings in the wall of inner tube 31.

For forming dams 6 and 7 in inner and outer tubes 31 and 33, jellys of suitable plastic resins are used and loaded into inner tube and outer tube 31 and 33 at suitable intervals. At the loaded positions in inner tube 31, jelly fills up small gaps between optical fiber unit 2 and inner tube 31 and any pores in optical fiber unit 2 to form dams 6. In outer tube 33, the loaded jelly impregnates into gaps between outer tube 33 and wound tension wires 32, between tension wires 32 and inner tube 31 and between adjacent tension wires 32 so that outer dams 7 are formed at suitable intervals.

Various sticky compounds can be used in place of the jelly. Jelly and sticky compounds may be used together to make different dams in a single cable.

The length of each dam and materials for the dam should be designed and selected so that the dam resists water pressure at a depth of the sea or ocean where the cable is laid.

Figure 6:
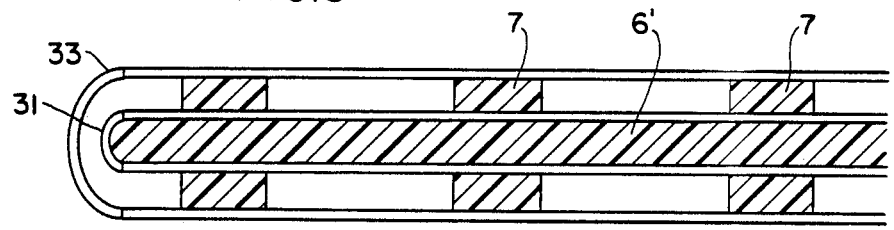
FIG. 6 is a view similar to FIG. 4 for illustrating another embodiment.

Referring to FIG. 6, another embodiment is characterized by a longitudinally continuous dam 6' which is made in the inner tube 31. The dam 6' can be formed by loading jelly or sticky compound into inner pipe 31 over the entire length. The dam 6' prevents any water from flowing into inner tube 31.

Figure 7:
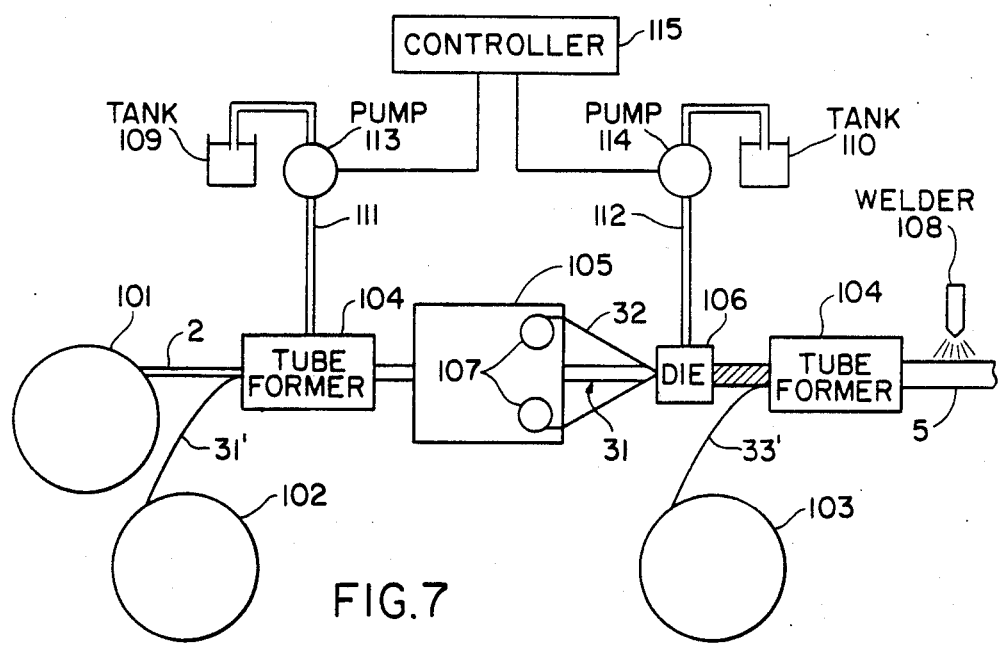
FIG. 7 is a schematic view for illustrating a production line for producing the pressure-resisting cable unit according to the present invention.

Referring to FIG. 7, a production line shown therein is for assembling pressure-resisting cable units 5 of FIGS. 3, 4 and 6.

An optical fiber unit supply 101, a metal tape supply 102 for the inner tube 31, and another metal tape supply 103 for the outer tube 33 are arranged and disposed along the line and spaced from one another. Optical fiber unit supply 101 has a preassembled long optical fiber unit 2 which is wound on a bobbin.

A tube former 104 is located at an end of the line and adjacent optical fiber unit supply 101 and metal tape supply 102. Optical fiber unit 2 and metal tape 31' are continuously introduced into tube former 104, where metal tape 31' is formed in a cylindrical form to surround optical fiber unit 2. Thus, optical fiber unit 2 covered with metal tube 31 is derived from tube former 104, and then passes in a central bore (not shown) in a cage 105 and is introduced into a die 106.

Tension wire supply bobbins 107 are mounted on cage 105, and tension wires are introduced into die 106 from bobbins 107. Cage 105 is controllably rotated so that tension wires 32 are wound on the inner metal tube mounted on optical fiber unit 2 at a suitable pitch.

Another tube former 104 is disposed downstream of die 106 and forms a tube from a metal tape 33' fed from metal tape supply 103 thereto onto the outer surface of the wound tension wires 32. Downstream of tube former 104, a welder 108 is disposed for welding the seam portion of the side edges of the tape 33' formed in a tube. Thus, pressure-resisting cable unit 5 is assembled and is wound on a bobbin (not shown).

In order to form dams 6 and 7 according to the present invention, tube former 104 and die 106 are provided with jelly or sticky compounds applicators, respectively, which are connected to tanks 109 and 110 by pipes 111 and 112 through pumps 113 and 114 respectively. In tanks 113 and 114, jelly or sticky compound is contained. Pumps 113 and 114 are driven under control by a controller 115.

In producing pressure-resisting cable unit 5 as shown in FIGS. 3 and 4, two pumps 113 and 114 are periodically driven with the same time intervals so as to form the inner dams 6 and the outer dams 7 at same positions along the pressure-resisting cable unit 5. It will be understood that both pumps 113 and 114 are not always required to be driven simultaneously, depending on the cable running speed and a distance between tube former 104 and die 106.

In case producing the pressure-resisting cable unit as shown in FIG. 6, pump 113 is continuously driven but pump 114 driven at time intervals.

Several cables as shown in FIGS. 3 and 4 were produced by the production line of FIG. 7. Two examples will be demonstrated below.

EXAMPLE 1

An optical fiber unit 2 having an outer diameter of 2.5 mm was produced, using a steel wire of 0.5 mm diameter as central tension member 21, a silicone coated optical fiber of 0.4 mm diameter as optical fiber core 22, a silicone rubber of 0.6 mm thickness as buffer layer 23. A pressure resisting sheath 3 was formed on the optical fiber unit 2 by use of the production line of FIG. 7, using an aluminum tape of 1 mm thickness for inner tube 31, steel wires for tension wires 32 and an aluminum tape for outer tube 33. Thus, a cable of 5 Km length was produced.

For the inner and the outer dams 6 and 7, sticky compound was used and was loaded over each 5 m length at intervals of 500 m length along the cable.

Water pressure of 800 atm. was applied to one end of the cable and maintained for two weeks. Thereafter, the cable was cut at intervals of 500 m length. As a result, no water was found out at a distance of 1 Km in the cable from the water pressure applied end and a small amount of water was observed in the cable only at about 500 m distance from the water pressure applied end.

EXAMPLE 2

A cable was produced similar to the cable of Example 1. But a jelly is loaded in place of the sticky compound to form dams, and the dams are formed with 10 m length at 100 m intervals. The produced cable of 3 Km length was subjected to the water pressure test similar to Example 1. As a result, it was observed that dams within an extent of about 2 Km from the water-pressure applied end were broken and that no water was found out beyond 2 Km from the cable end. This means the use of jelly can localize the water entrance to a cable section of about 2 Km length.

It will be understood from the above-described embodiments that even if the cable according to the present invention is partially damaged, the cable is not required to be replaced entirely by a new one but can be repaired by replacing only a limited length which is wetted by sea water on the cable ship.

Figure 8:
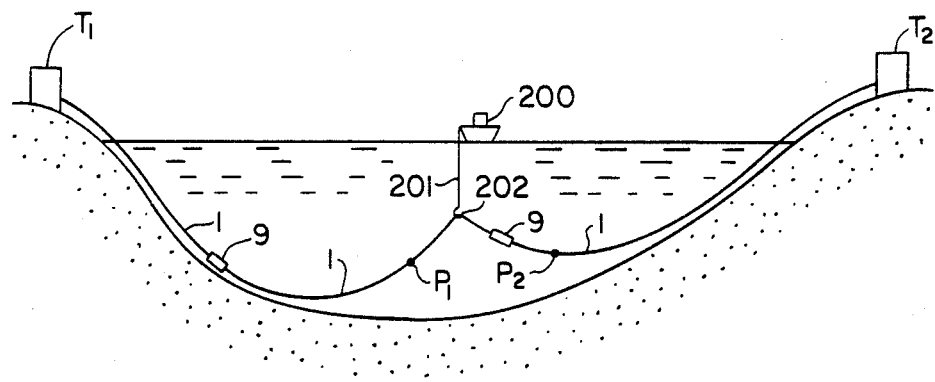
FIG. 8 is a schematic view for illustrating a condition where a submarine cable is hanged up onto a ship for repairing the cable.

Referring to FIG. 8, two end terminals $T_1$ and $T_2$ are connected by submarine optical fiber cables 1 through repeaters 9 which are laid on the seabed. When cable 1 between two repeaters 9 is damaged at a point $P_1$, the cable is hanged up onto a cable ship 200 by a rope 201 with a hook 202 attached to the lower end of rope 201. In order to detect the position of the damaged point $P_1$, the cable is cut at a point in the hanged up cable section, and a pulse signal is applied to the cable at the cut ends from a detecting apparatus. A distance from the cut point to the damaged point $P_1$ can be known from a signal reflected at the damaged point $P_1$. However, since the pulse signal is also reflected at repeater 9, the position of the damaged point $P_1$ cannot be readily identified.

When a cable 1 between a terminal $T_2$ and a repeater 9 is damaged at a point $P_2$, the damaged point $P_2$ can be known by performing a test at the terminal $T_2$.

According to an aspect of the present invention, an optical fiber submarine cable having a scale is obtained wherein the scale represents a distance from one end of the cable.

Figure 9:
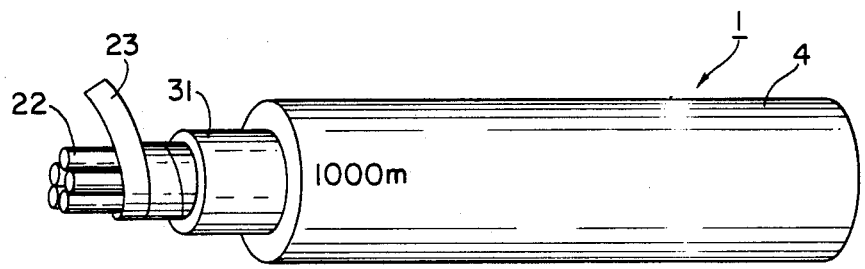
FIGS. 9 and 10 are partially exploded perspective views of sections of optical fiber submarine cables of different embodiments.

Referring to FIG. 9, the scale is provided onto the outer surface of water-proof outer jacket 4 of cable 1. That is, a numeral indicating a distance, for example, "1000 m" is printed or imprinted on the jacket 4 at the distance of 1000 m from one end of the cable 1.

In the arrangement, the position of the hanged up cable section can be readily known from the scale. Therefore, the damaged point can be readily found out.

Referring to FIG. 8 again, if the position of the hanged up cable section is known, the damaged point $P_1$ can be readily detected by the test apparatus, because the cable length between repeaters 9 are already known so that the distances from the hanged up section to respective repeaters 9 are also known by simple calculation.

Figure 10:
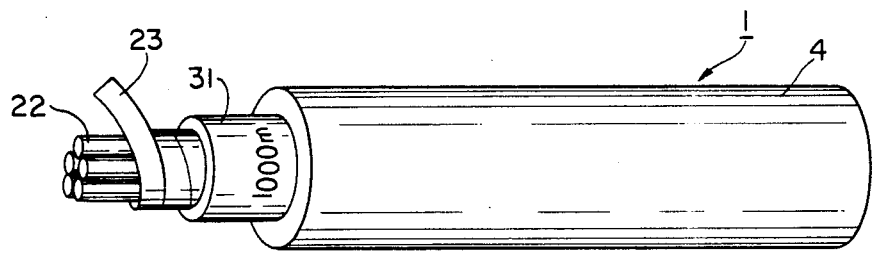

The scale can be provided on the outer jacket as shown in FIG. 9, but can be also provided on various inner components of the cable, for example, as shown in FIG. 10.

Referring to FIG. 10, numerals, for example, "1000 m" are printed or imprinted on the surface of inner metal tube 31.

What is claimed is:

1. In a submarine optical fiber cable which includes an optical fiber unit comprising a tension member, at least one optical fiber core and a buffer layer of an insulating material covering said tension member and said optical fiber core together, a pressure resisting sheath mounted on said optical fiber unit and comprising an inner metal tube mounted on said buffer layer, tension wires helically wound on said inner metal tube and an outer metal tube mounted on said tension wires, and a waterproof outer jacket, the improvement which comprises a plurality of outer dam means each of a certain longitudinal length and provided in corresponding spaces between said inner and said outer metal tubes and tension wires at predetermined intervals, to prevent water from flowing longitudinally in said spaces, and inner dam means disposed in the interior of said inner metal tube, said inner dam means being arranged to prevent water from flowing longitudinally along said optical fiber unit in said interior of said inner metal tube, said inner dam means being disposed at a plurality of positions corresponding to the locations of said plurality of outer dam means along said cable so that portions of each of said outer dam means are coextensive with corresponding portions of said inner dam means in the longitudinal direction, and water is prevented by the coextensive portions of said inner and said outer dam means from otherwise flowing longitudinally in said cable alternatingly between outer and inner cable spaces bounded by said outer and said inner dam means when said inner metal tube has a longitudinal gap.

2. The submarine optical fiber cable as claimed in claim 1, wherein said inner dam means extends continuous without gaps in the longitudinal direction.

3. The submarine optical fiber cable as claimed in claim 1, wherein said outer and said inner dam means are formed of one of a sticky compound and a jelly of plastics material which is loaded at respective dam positions.

4. The submarine optical fiber cable as claimed in claim 2, wherein one of said outer and said inner dam means is formed of a sticky compound loaded at the positions of said one dam means, the other one being formed of a jelly of plastics resin loaded at the positions of the other dam means.

5. The submarine optical fiber cable as claimed in claim 1, which further comprises a scale for representing distance from one end of the cable.

6. The submarine optical fiber cable as claimed in claim 5, wherein said scale is provided on the outer surface of said water-proof outer jacket.

7. The submarine optical fiber cable as claimed in claim 5, wherein said scale is provided on the outer surface of said inner or said outer metal tube of said pressure resisting sheath.

* * * * *